United States Patent
Meyer et al.

(10) Patent No.: US 11,747,200 B2
(45) Date of Patent: Sep. 5, 2023

(54) OPTICAL PROCESS SENSOR, MEASURING HEAD, MEASURING SYSTEM COMPRISING THE TWO AND METHOD FOR CALIBRATION AND/OR VALIDATION

(71) Applicant: Endress+Hauser Conducta GmbH+Co. KG, Gerlingen (DE)

(72) Inventors: Hans Meyer, Eschach (DE); Joachim Mannhardt, Aalen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 137 days.

(21) Appl. No.: 17/388,493

(22) Filed: Jul. 29, 2021

(65) Prior Publication Data
US 2022/0042846 A1    Feb. 10, 2022

(30) Foreign Application Priority Data
Aug. 5, 2020 (DE) ..................... 10 2020 120 718.2

(51) Int. Cl.
*G01J 3/02* (2006.01)
*G01N 21/25* (2006.01)

(52) U.S. Cl.
CPC ............. *G01J 3/0297* (2013.01); *G01J 3/027* (2013.01); *G01J 3/0235* (2013.01);
(Continued)

(58) Field of Classification Search
CPC ...... G01J 3/0297; G01J 3/0235; G01J 3/0264; G01J 3/027; G01J 3/0291; G01N 21/255;
(Continued)

(56) References Cited

U.S. PATENT DOCUMENTS

| 4,786,171 A * | 11/1988 | LeFebre | ............... G01N 21/85 356/326 |
| 2001/0035957 A1 * | 11/2001 | Clermont | .................. G01J 3/02 356/451 |

(Continued)

FOREIGN PATENT DOCUMENTS

| DE | 10149879 A1 * | 4/2003 | ............... G01J 3/02 |
| DE | 10149879 A1 | 4/2003 | |

(Continued)

OTHER PUBLICATIONS

English Translation (Description only) of Orban et al., "Spectral photochemical analyzer of liquid media has waveguide tip containing parts of light guide element with recess functioning as cuvette for receiving measuring medium", Apr. 30, 2003, EPO (Year: 2003).*

*Primary Examiner* — Tarifur R Chowdhury
*Assistant Examiner* — Akbar Hassan Rizvi
(74) *Attorney, Agent, or Firm* — Christopher R. Powers; Endress+Hauser (USA) Holding, Inc.

(57) ABSTRACT

An optical process sensor for measuring at least one measured variable of a medium in a container includes: a housing; a light source in the housing for emitting transmission light; a light detector in the housing for receiving reception light; and an interface including a first mechanical section, which is an integrated part of the housing, and a first optical section having a first path and a first light guide, wherein the first light guide is configured such that transmission light is guided from the light source into the first path via the first light guide and decouples transmission light from the housing, and having a second path and a second light guide, wherein the second light guide is configured such that reception light is coupled into the interior of the (Continued)

housing and guided from the second path to the light detector via the second light guide.

10 Claims, 10 Drawing Sheets

(52) U.S. Cl.
CPC .......... *G01J 3/0264* (2013.01); *G01J 3/0291* (2013.01); *G01N 21/255* (2013.01)

(58) Field of Classification Search
CPC .................. G01N 21/03; G01N 21/93; G01N 2021/8514; G01N 2021/8521; G01N 2021/8528; G01N 2201/086; G01N 21/8507; G01N 21/01; G01N 21/274
See application file for complete search history.

(56) References Cited

U.S. PATENT DOCUMENTS

2017/0292909 A1    10/2017  Frojdh et al.
2019/0331595 A1*   10/2019  Matsuo .................. G01N 21/55

FOREIGN PATENT DOCUMENTS

| DE | 202013101907 U1 | 5/2013 |
| EP | 0660106 A1 | 6/1995 |
| EP | 3561488 A1 | 10/2019 |
| WO | 2012033466 A1 | 3/2012 |
| WO | 2013087753 A1 | 6/2013 |

* cited by examiner

OPTICAL PROCESS SENSOR, MEASURING HEAD, MEASURING SYSTEM COMPRISING THE TWO AND METHOD FOR CALIBRATION AND/OR VALIDATION

CROSS-REFERENCE TO RELATED APPLICATION

The present application is related to and claims the priority benefit of German Patent Application No. 10 2020 120 718.2, filed on Aug. 5, 2020, the entire contents of which are incorporated herein by reference.

TECHNICAL FIELD

The present disclosure relates to an optical process sensor, a matching measuring head, a measuring system comprising the two and a method for calibration and/or validation.

BACKGROUND

"Process sensor" within the meaning of this application refers to sensors which serve to optimize, analyze, and control production processes on the field level, such as in the chemical or pharmaceutical industry. Such process sensors enable qualitative and quantitative analysis during the ongoing process. For example, physical or chemical parameters are detected in real time and used for system control or regulation.

DE 20 2013 101 907 U1 explains that with such process sensors, it is necessary from time to time to clean the sample chamber or the sensor, for which purpose short-wave radiation, such as gamma radiation, or even high temperatures can be used. Considerable risks are thus associated with the comparatively sensitive optics of measuring probes; especially, the aggressive radiation or the high temperatures can cause destruction of the optical part of the measuring probe, so provisions must be made to protect the sensitive optics from damage or even destruction when they are cleaned. DE 20 2013 101 907 U1 proposes in this respect that the part coming into direct contact with the sample to be examined is detachable so that it can be easily removed from the sensitive parts of the sensor during cleaning.

Optical sensors used, for example, in the food and pharmaceutical industries must be regularly validated with regard to their correct mode of operation. The properties to be tested here are governed in the United States Pharmacopoeia (USP) and a corresponding equivalent in Europe, among others. These properties are, for example, wavelength correctness, photometric correctness or linearity, scattered light behavior, and resolution capability with respect to wavelength.

For the tests described above, test fluids and solids standards in cuvette form or filter sets with the corresponding certificates are available for laboratory devices. The laboratory devices can be validated in a simple manner with these standards. To this end, the cuvette standards or the filters are introduced into the beam path of the instrument to be validated.

This procedure is not possible with process sensors because the optical beam path is not accessible; it is especially protected from the harsh process environment. Process sensors frequently operate with measuring cells, which are connected with light sources and light detectors to a decoupled measuring system via light guides. To validate the measuring system, the light guides on the corresponding measuring cell are removed and connected to a cuvette holder.

There are devices with a slot in the beam path into which mechanically adapted filters, usually solids filters, can be brought into the beam path. These solutions have the disadvantage that often, no standards with certified values can be used in this case.

SUMMARY

The object of the present disclosure is validating and calibrating process sensors in a simple manner.

The object is achieved by an optical process sensor for measuring at least one measured variable of a medium in a container, comprising: a housing; a light source in the housing for emitting transmission light; a light detector in the housing for receiving reception light; and a first optical/mechanical interface comprising: a first optical section projecting from the housing, having a first path and a first light guide, wherein the first light guide is designed in such a way that transmission light is guided from the light source into the first path via the first light guide, and decouples transmission light from the housing, and having a second path and a second light guide, wherein the second light guide is designed in such a way that reception light is coupled into the interior of the housing and guided from the second path to the light detector via the second light guide, and a first mechanical section which is designed as an integral part of the housing.

The advantages of the solution having the described optical sensor, primarily in interaction with a measuring head, which together form an optical measuring system, are discussed further below.

One embodiment provides that the first and second light guides are configured as optical wave guides.

One embodiment provides that the first and second paths are configured as two separate rod-shaped, for example, cylindrical, extensions, which are connected to the housing, for example, by means of screwing, gluing, welding, or by force-fitting, wherein the first and second light guides are guided inside the extensions.

One embodiment provides that the first and second paths comprise, for example, respectively, an optical element, for example, a window and/or a lens, at the end region remote from the process sensor, wherein the optical element is transparent to the transmission light and reception light.

One embodiment provides that the sensor is configured as a spectrometer.

The object is furthermore achieved by an optical process sensor, which is configured to measure at least one measured variable of a medium in a container, the measuring head comprising: a housing, which is configured to connect the sensor to the container; a second optical/mechanical interface, comprising a second optical section complementary to a first optical section.

In one embodiment, the second optical section is configured as a recess in the housing.

The first optical section comprises a third path that receives transmission light and couples it into the interior of the housing.

In one embodiment, the third path guides transmission light to a deflection element.

The first optical section comprises a fourth path which receives transmission light, guides it through a region through which the medium flows, wherein the transmission light is converted by the medium into reception light, and decouples reception light from the housing.

The second optical/mechanical interface comprises a second mechanical section, which is complementary to a first mechanical section and designed as an integral part of the housing.

One embodiment provides that the measuring head comprises a deflection element in the housing which deflects transmission light or reception light from the third path into the fourth path or vice versa.

In one embodiment, the region through which the medium flows is configured as a further recess in the housing.

In one embodiment, the measuring head thus comprises an optical process sensor, which is designed to measure at least one measured variable of a medium in a container, the measuring head comprising: a housing, which is designed to connect the sensor to the container; a second optical/mechanical interface comprising a second optical section, which is complementary to a first optical section and designed as a recess in the housing, a third path, which receives transmission light, couples it into the interior of the housing, and guides it to a deflection element, and a fourth path which receives transmission light from the deflection element, guides it through a region through which the medium flows, wherein the transmission light is converted by the medium into reception light, and decouples reception light from the housing, and a second mechanical section, which is complementary to a first mechanical section and designed as an integral part of the housing, the deflection element, which is arranged in the housing, and the region through which the medium flows and which is designed as a further recess in the housing.

In one embodiment, the measuring head comprises an optical process sensor, which is designed to measure at least one measured variable of a medium in a container, the measuring head comprising: a housing, which is designed to connect the sensor to the container; a second optical/mechanical interface comprising a second optical section, which is complementary to a first optical section and designed as a recess in the housing, a third path, which receives transmission light, couples it into the interior of the housing, guides it through a region through which the medium flows, wherein the transmission light is converted by the medium into reception light, and guides reception light to a deflection element, and a fourth path, which receives reception light from the deflection element and decouples it from the housing, and a second mechanical section, which is complementary to a first mechanical section and designed as an integral part of the housing, the deflection element, which is arranged in the housing, and the region through which the medium flows and which is designed as a further recess in the housing.

The path through which the medium flows can thus be arranged in the third or in the fourth path.

The use of an optical/mechanical interface on each sensor and measuring head makes it possible to decouple various types of measuring heads, such as immersion probes or flow cells, from process sensors. As a result, the measuring head can remain in the process and keeps it sealed for the further validation process of the sensor.

The removed sensor with the optical/mechanical interface can now be used for the validation process as a validation device. By replacing the measuring head on the sensor with a validation adapter (which is a particular embodiment of a measuring head) for accommodating certified cuvettes or filters, the sensor can be easily checked.

As with a laboratory spectrometer, this validation device and the possibility of being able to use certified standards (cuvettes, filters) enable complete validation of the process sensor.

One embodiment provides that the deflection element deflects the transmission light by 180°.

One embodiment provides that the deflection element is designed as a prism.

One embodiment provides that the third and fourth paths are designed as two separate rod-shaped, for example, cylindrical, recesses.

One embodiment provides that the third and fourth paths comprise, for example, respectively, an optical element, for example, a window and/or a lens, wherein the optical element is transparent to the transmission light and reception light.

One embodiment provides that the third or fourth path comprises a window for the region through which the medium flows, wherein the window is transparent to the transmission light and reception light.

One embodiment provides that the measuring head is designed as an immersion probe.

One embodiment provides that the measuring head is designed as a flow probe.

One embodiment provides that the measuring head is adapted as a calibration and validation device.

The particular advantages of the optical/mechanical interface can be seen here. Various measuring heads can easily be replaced. The "actual" measuring head, e.g., a flow probe or immersion probe, remains in the process. After removal of the sensor, a calibration and validation device is placed onto the same optical/mechanical interface. The optical path is the same as in the process, and the sensor can be calibrated.

One embodiment provides that the calibration and validation device comprises a cuvette holder with a mounting for a cuvette, wherein the mounting forms the region through which the medium flows.

One embodiment provides that the cuvette holder comprises a solids standard.

One embodiment provides that the calibration and validation device comprises a cuvette changer.

One embodiment provides that the calibration and validation device comprises a filter wheel or filter changer.

This also enables an automatic check of the process sensors by means of an appropriate changing unit (e.g., filter wheel, cuvette changer).

The object is furthermore achieved by an optical measuring system comprising an optical process sensor as described above and a measuring head as described above, wherein the second optical section accommodates the first optical section in order to enable an optical connection to a light path including of light source, first light guide, first path, third path, deflection element, fourth path, second path, second light guide, and light detector, and enables a mechanical connection of optical process sensor and measuring head via the first mechanical section and second mechanical section.

One embodiment provides that the mechanical connection can be released; the first mechanical section and the second mechanical section are configured in such a way that there is a screw connection; the first mechanical section and the second mechanical section, for example , comprise bores and/or threads for screws.

The object is furthermore achieved by a method for calibrating and/or validating an optical process sensor, comprising the steps of: removing the sensor from a measuring head, which is configured as a flow probe or immersion probe; attaching the sensor to a measuring head, which is adapted as a calibration and validation device; calibrating and validating the sensor by means of the calibration and validation device; removing the sensor from the calibration and validation device; and reattaching the sensor to the flow probe or immersion probe.

BRIEF DESCRIPTION OF THE DRAWINGS

The embodiments of the present disclosure are explained in more detail with reference to the following figures.

In the figures, the same features are identified by the same reference signs.

DETAILED DESCRIPTION

Figure 2A:
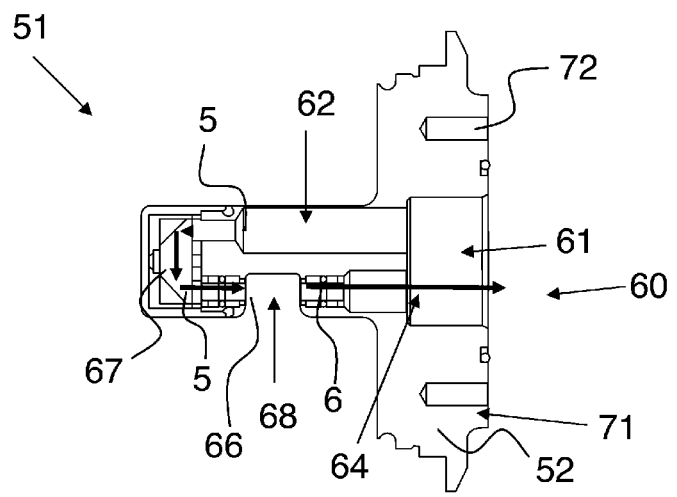
FIGS. 2a-2d show an immersion probe embodiment of a measuring system according to the present disclosure.
Figure 2B:
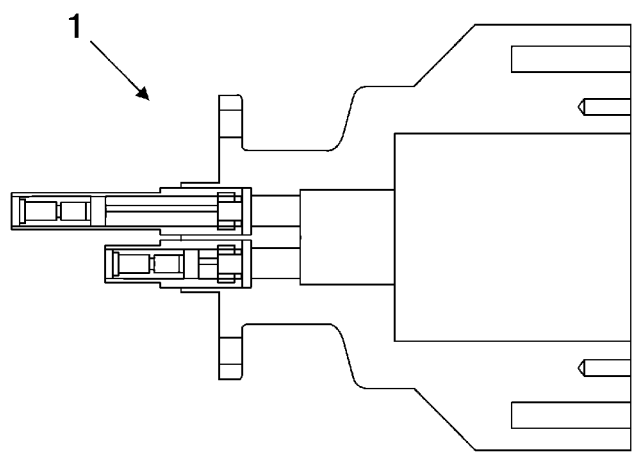
Figure 2C:
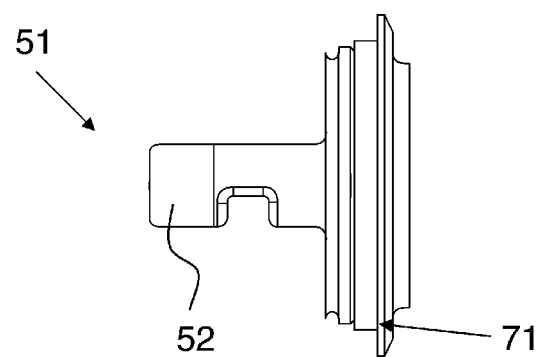
Figure 2D:
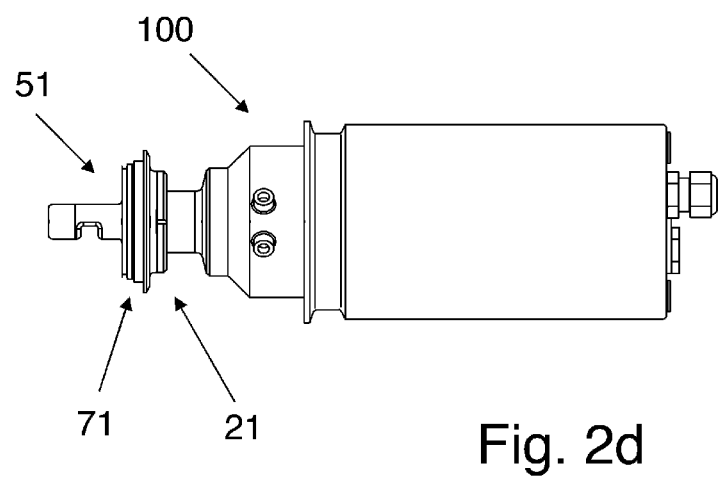

A measuring system according to the present disclosure in its entirety is denoted by reference sign 100 and is shown, for example, in FIG. 2d. First, the individual components are discussed, namely a process sensor 1 and a measuring head 51.

Figure 1A:
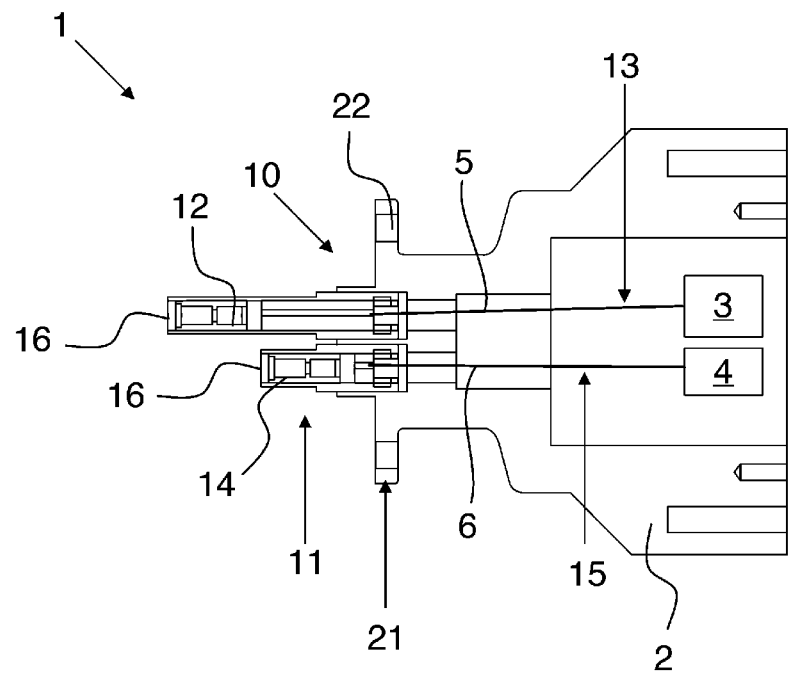
FIGS. 1a and 1b show an optical process sensor according to the present disclosure in cross-section and side views, respectively.
Figure 1B:
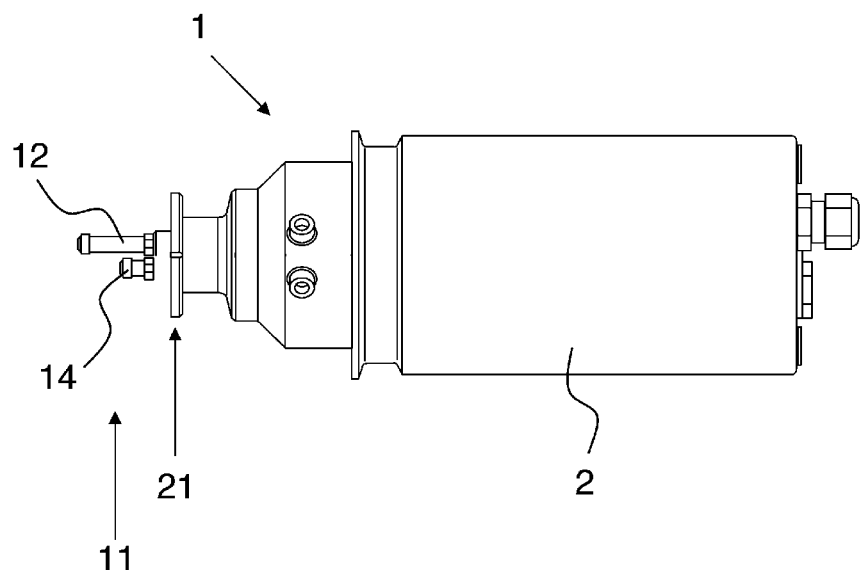

FIG. 1a and FIG. 1b show the sensor 1 with the housing 2. The sensor 1 is an optical sensor. Said sensor 1 is, for example, a spectrometer with a light source 3 and a light detector 4. The light source 3 transmits transmission light 5, and the light detector 4 receives reception light 6, which is produced by conversion of the transmission light 5 at the medium to be measured (see below). The light 5 emitted by the light source 3 is thus converted by the medium, for example, absorbed, scattered or fluorescent light is produced. This converted reception light 6 is captured by the detector 4 and converted into an electrical signal.

The sensor 1 comprises a first optical/mechanical interface 10 including an optical section 11 and a mechanical section 21.

The mechanical section 21 serves to connect the sensor 1 to the measuring head 51, for example, by screw attachment, wherein corresponding devices, for example, holes, threads or bores 22 and 72, are present. The mechanical section 21 may be an integral part of the housing 2.

The optical section 11 projects from the housing 2. Said optical section 11 comprises a first path 12 and a first light guide 13, for example, an optical wave guide or a free beam guide, which introduces transmission light 5 from the light source 3 into the first path 12 and then decouples transmission light 5 from the housing 2. Said optical section 11 further comprises a second path 14 and a second light guide 15, for example, an optical wave guide or a free beam guide, which couples reception light 6 into the interior of the housing 2 and guides the reception light 6 from the second path 14 to the light detector 4 via the second light guide 15. The paths 12, 14 include separate, cylindrical extensions, which are, for example, screwed to the housing 2, wherein the optical wave guides 13, 15 are guided in the interior.

FIG. 2a shows the measuring head 51 in cross-section; FIG. 2c shows measuring head 51 in a side view. FIG. 2b shows the sensor 1 directly next to FIG. 2a. FIG. 2d shows the measuring system 100 in the assembly of sensor 1 and measuring head 51.

The measuring head 51 comprises a second optical/mechanical interface 60, which includes an optical section 61 and a mechanical section 71.

The mechanical section 71 serves to connect the measuring head 51 to the sensor 1, for example, by screw attachment, wherein corresponding features, for example, holes, threads or bores 22 and 72, are present. The mechanical section 71 is an integral part of the housing 52.

In addition, the housing 52 is configured to be connected to a container in which a measuring medium to be measured is located. The housing 52 comprises corresponding connecting means for this purpose. The connecting means can be configured, for example, as a welded or flanged connection, for example, made of stainless steel. However, other embodiments are possible. The container can be, for example, a tank, boiler, pipe, pipeline or the like.

The second optical/mechanical interface 60 comprises a second optical section 61, which is complementary to the first optical section 11 and configured as a recess in the housing 52. Said second optical section 61 includes a third path 62, which receives transmission light 5, couples it into the interior of the housing 52, and guides it to a deflection element 67. Said second optical section 61 further includes a fourth path 64, which receives transmission light 5 from the deflection element 67, guides it through a region 68 through which the measuring medium flows, wherein the transmission light 5 is converted into reception light 6 by the medium in the region 68 through which the medium flows, and finally decouples reception light 6 from the housing 52 again.

The deflection element 67 deflects the transmission light 5 by 180° and is designed as a prism.

The third and fourth paths 62, 64 may be configured as two separate rod-shaped, for example, cylindrical, recesses. The third and fourth paths 62, 64 are configured to be complementary to the first and second paths 12, 14 such that the extensions fit precisely into the recesses. If the sensor 1 and the measuring head 51 are assembled and mechanically fixed via the mechanical sections 11, 61, the two optical sections 11, 61 are positioned in such a way that the transmission light 5 or the reception light 6 are guided by the sensor 1 into the head 51 or vice versa. There are embodiments with lenses 16 (as shown) or windows.

The transmission light 5 temporarily exits the measuring head 51, passes through the region 68 through which the medium flows, and then enters the housing 52 again at a corresponding location. Transparent windows 66 isolate the interior from the medium (for the sake of clarity, the reference sign points only to the left window). The path 68 through which the medium flows can be arranged in the third or in the fourth path 62, 64.

FIGS. 2a-2d show an embodiment of the measuring head 51 as an immersion probe. In such an embodiment, the measuring head 51 is placed in the medium to be measured and remains there during a measurement operation. However, the measuring head 51 can also be removed, for example, for maintenance purposes such as changing seals, from the process and from the sensor 1.

Figure 3A:
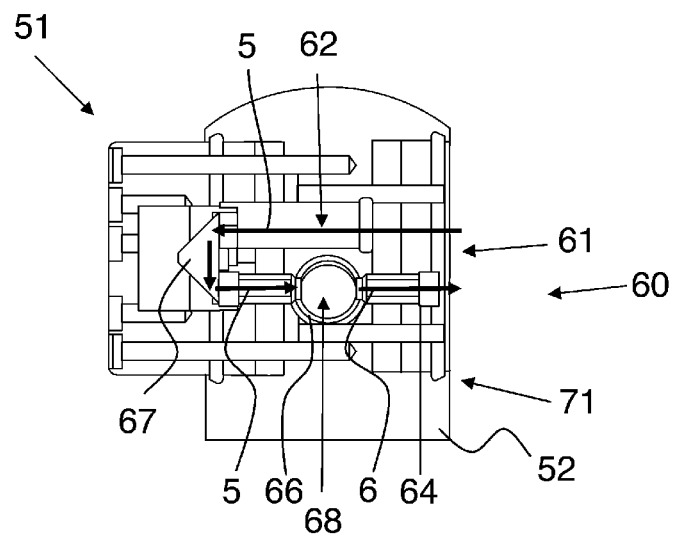
FIGS. 3a-3d show a flow probe embodiment of a measuring system according to the present disclosure.
Figure 3B:
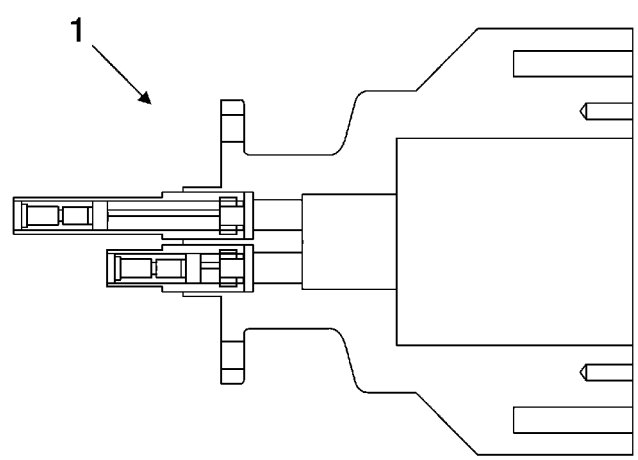
Figure 3C:
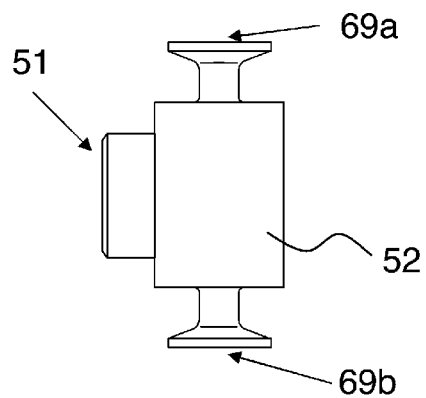
Figure 3D:
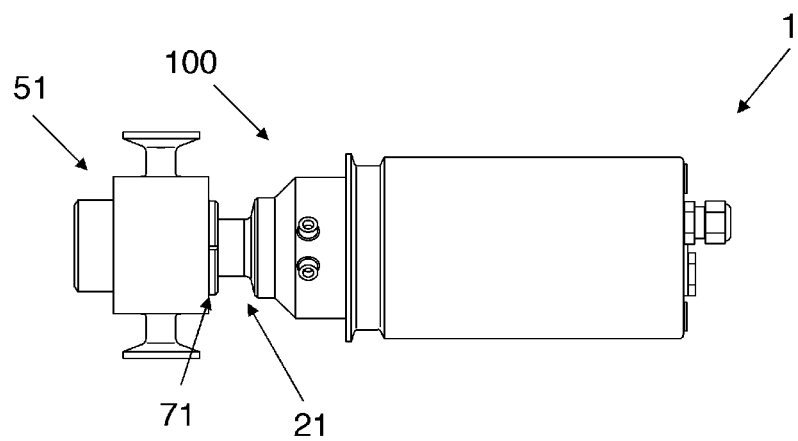

FIGS. 3a-3d are systematically constructed similarly, wherein the measuring head 51 is configured as a flow probe in the embodiment shown. The medium flows through an input 69a and leaves the flow probe again at the output 69b, as shown in FIG. 3c. The region 68 through which the medium flows is located in the interior.

If a validation or calibration of the sensor 1 becomes necessary or desired, it can easily be removed from the measuring head 51 in the process (e.g., implementation as a flow probe) by releasing the screw connection.

The measuring head 51 can be configured as a calibration and validation device. This is shown in FIGS. 4a-e, wherein FIGS. 4a-d are initially systematically constructed similarly to FIGS. 2a-2e.

The sensor 1 is thus removed and the measuring head 51 in the embodiment is attached as a calibration and validation device to the sensor 1, which likewise has a second optical/mechanical interface 60.

Figure 4A:
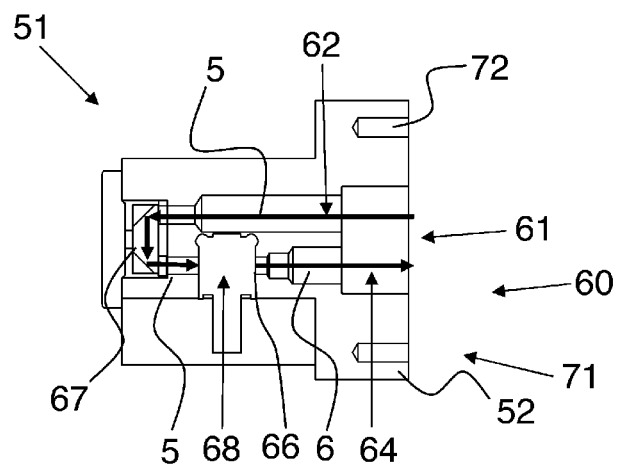
FIGS. 4a-4e show a cuvette holder embodiment of a measuring system according to the present disclosure.
Figure 4B:
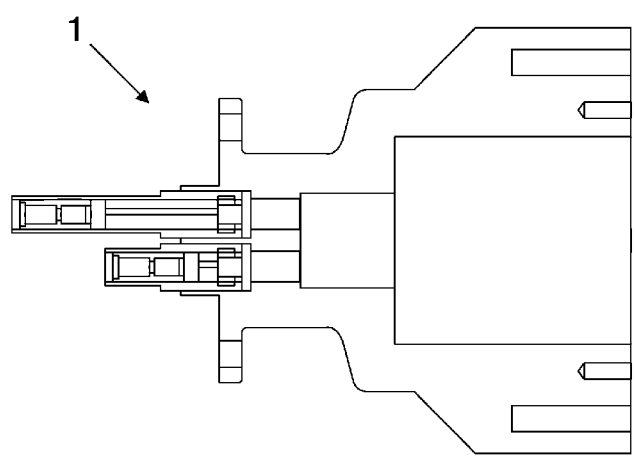
Figure 4C:
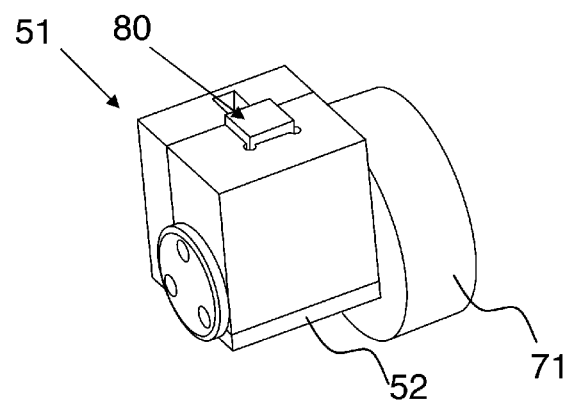
Figure 4D:
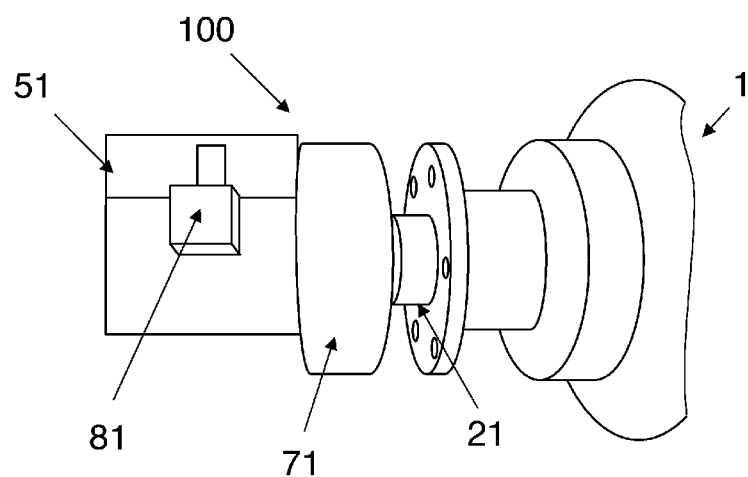

One embodiment of the calibration and validation device is a cuvette holder. The holder 80 into which a cuvette 81 is introduced is located at the region 68 through which the medium flows. The cuvette 81 can be configured as a standard, for example, as a solids standard. The assembled state is shown in FIG. 4d, wherein the cuvette holder is not yet completely installed.

Figure 4E:
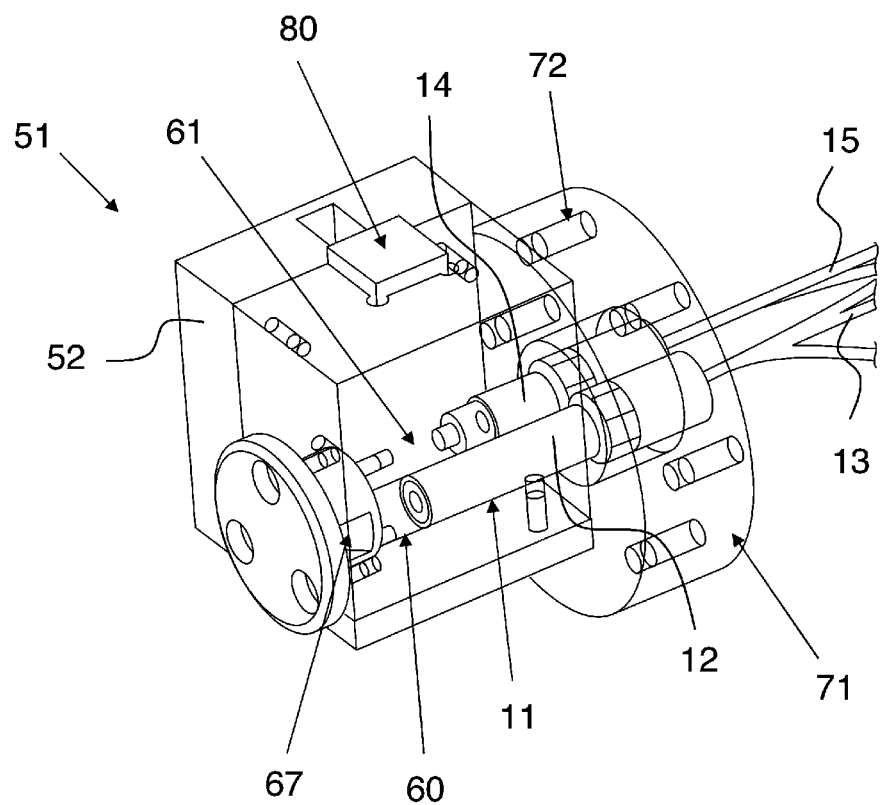
Figure 5:
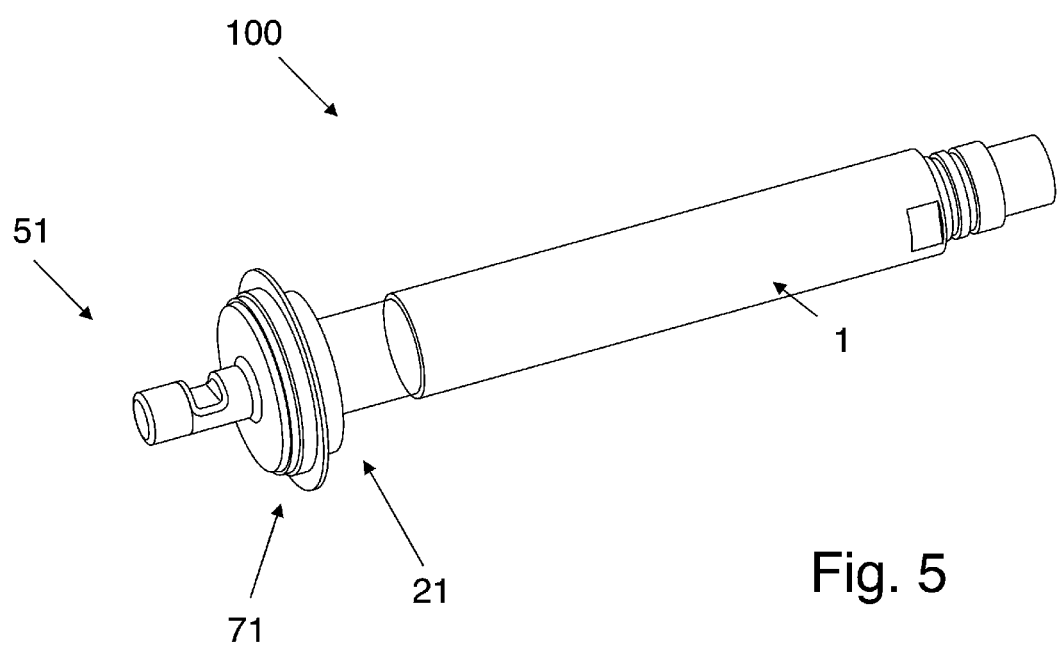
FIG. 5 shows an LED sensor embodiment of a measuring system according to the present disclosure.
Figure 6A:
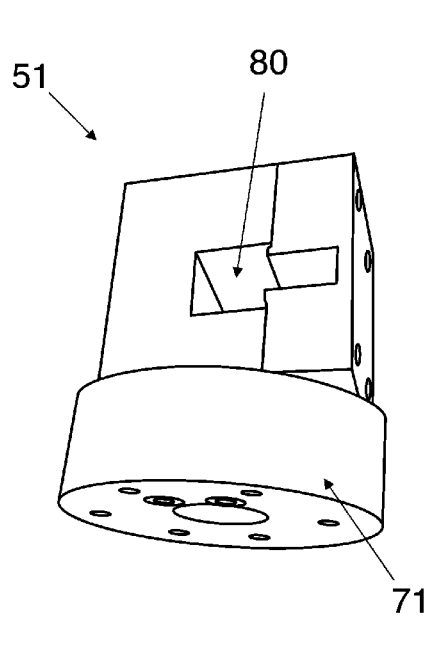
FIGS. 6a-6c show a cuvette holder according to the present disclosure with and without a solids standard.
Figure 6B:
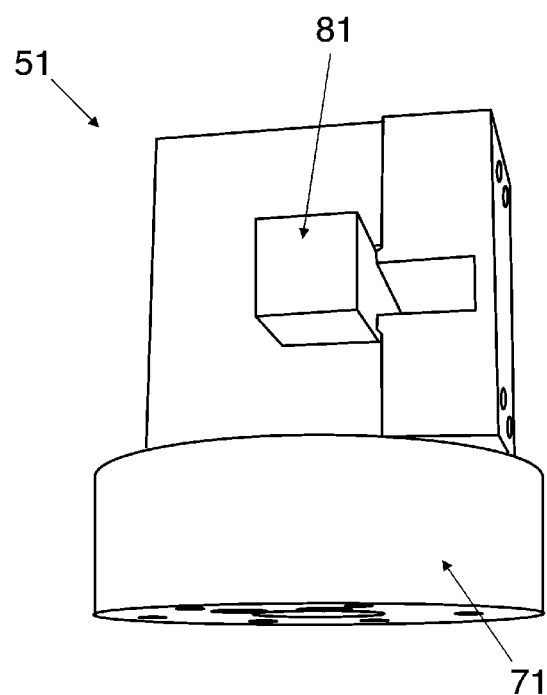
Figure 6C:
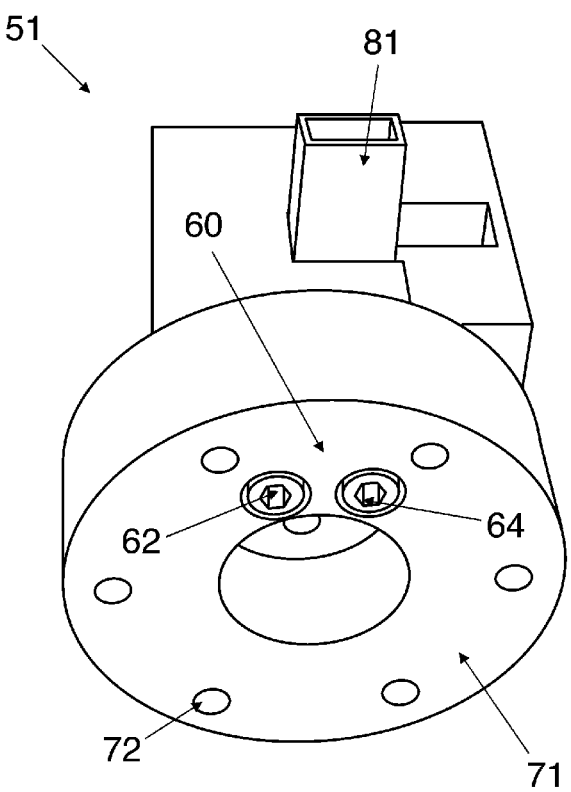

FIG. 4e shows the embodiment as a cuvette holder with a sensor inserted, wherein only the first optical section 11 is visible. Some components are rendered transparent for clarity to show the assembly, primarily the optical sections 11, 61. The sensor 1 can be calibrated, validated, and adjusted, if necessary, by means of the cuvette holder 51.

The calibration and validation device can also be configured as a cuvette changer, filter wheel, or filter changer. Various absorptions can be set on the filter wheel so that various situations can be simulated by turning.

After calibration and/or validation, the sensor 1 may be removed from the calibration and validation device and again connected to the other measuring head, for example, the immersion probe or the flow probe.

We claim:

1. An optical measuring system for measuring at least one measured variable of a medium in a container, the optical measuring system comprising:
an optical process sensor for measuring the at least one measured variable of the medium, the optical process sensor comprising:
a sensor housing defining an interior;
a light source disposed in the sensor housing and configured to emit transmission light;
a light detector disposed in the sensor housing and configured to receive reception light, wherein the transmission light is converted by the medium into the reception light; and
a first optical-mechanical interface comprising a first mechanical section, which is configured as an integral portion of the sensor housing, and a first optical section extending from the sensor housing, the first optical section comprising:
a first path and a first light guide, wherein the first light guide is configured such that the transmission light is guided from the light source into the first path via the first light guide and such that the transmission light is decoupled from the sensor housing, wherein the first path is configured as a rod-shaped element extending from the sensor housing; and
a second path and a second light guide, wherein the second light guide is configured such that the reception light is coupled into the interior of the sensor housing and guided from the second path to the light detector via the second light guide, wherein the second path is configured as a rod-shaped element extending from the sensor housing; and
a measuring head comprising:
a measuring head housing defining an interior and configured to enable the optical process sensor to connect to the container; and
a second optical-mechanical interface comprising:
a second mechanical section configured to be complementary to the first mechanical section, wherein the second mechanical section is an integral portion of the measuring head housing; and
a second optical section configured to be complementary to the first optical section and comprising:
a third path configured to receive the transmission light from the optical process sensor and to couple the transmission light into the interior of the measuring head housing, wherein the third path is configured as a rod-shaped recess complementary to and in optical communication with the first path such that the first path is at least partially disposed within the third path; and
a fourth path configured to receive and guide the transmission light into a region through which the medium flows, wherein the fourth path is configured as a rod-shaped recess complementary to and in optical communication with the second path such that the second path is at least partially disposed within the fourth path, and wherein the fourth path is further configured to decouple the reception light from the measuring head housing.

2. The optical measuring system of claim 1, wherein the optical process sensor is a spectrometer.

3. The optical measuring system of claim 1, wherein the measuring head is configured as an immersion probe.

4. The optical measuring system of claim 1, wherein the measuring head is configured as a flow probe.

5. The optical measuring system of claim 1, wherein the measuring head is configured as a calibration and validation device.

6. The optical measuring system of claim 5, wherein the calibration and validation device comprises a cuvette holder, which includes a mounting for a cuvette, wherein the mounting defines the region through which the medium flows.

7. The optical measuring system of claim 5, wherein the calibration and validation device comprises a cuvette changer, filter wheel or filter changer.

8. An optical measuring system for measuring at least one measured variable of a medium in a container, the optical measuring system comprising:
an optical process sensor comprising:
a first housing defining an interior;
a light source disposed in the first housing and configured to emit transmission light;
a detector disposed in the first housing and configured to receive reception light; and
a first optical-mechanical interface comprising a first mechanical section, which is configured as an integral portion of the first housing, and a first optical section extending from the first housing, the first optical section comprising:
a first path and a first light guide, wherein the first light guide is configured such that the transmission light is guided from the light source into the first path via the first light guide and such that the transmission light is decoupled from the first housing; and a second path and a second light guide, wherein the second light guide is configured such that the reception light is coupled into the interior of the first housing and guided from the second path to the light detector via the second light guide; and a measuring head configured for optical communication with the optical process sensor, the measuring head comprising:

a second housing defining an interior and configured to enable the optical process sensor to connect to the container; and a second optical-mechanical interface comprising:

a second mechanical section configured to be complementary to a first mechanical section of the optical process sensor, wherein the second mechanical section is an integral portion of the second housing; and a second optical section configured to be complementary to a first optical section of the optical process sensor and comprising:

a third path configured to receive transmission light from the optical process sensor and couples the transmission light into the interior of the second housing; and a fourth path configured to receive and guide the transmission light through a region through which the medium flows, wherein the transmission light is converted by the medium into reception light, and wherein the fourth path is further configured to decouple the reception light from the second housing, wherein the third path and the fourth path are each configured as a rod-shaped recess that is complementary to and in optical communication with its corresponding first path and second path, respectively, wherein the second optical section accommodates the first optical section as to enable an optical connection to a light path, which includes the light source, the first light guide, the first path, the third path, a deflection element, the fourth path, the second path, the second light guide and the light detector, and wherein the second optical section enables a mechanical connection of the optical process sensor and the measuring head via the first mechanical section and second mechanical section.

9. The optical measuring system of claim 8, wherein:
the mechanical connection is releasable;
the first mechanical section and the second mechanical section are configured for a screw connection; and
the first mechanical section and the second mechanical section comprise complementary bores and/or threads for the screw connection.

10. A method for calibrating and/or validating the optical process sensor of the optical measuring system according to claim 7, the method comprising:

removing the optical process sensor from the measuring head, which is configured as a flow probe or an immersion probe;

attaching the optical process sensor to the measuring head, which is configured as a calibration and validation device;

calibrating and validating the optical process sensor using the calibration and validation device;

removing the optical process sensor from the calibration and validation device; and reattaching the optical process sensor to the flow probe or immersion probe.

* * * * *